(No Model.) 2 Sheets—Sheet 1.
T. J. GLOVER.
BICYCLE BRAKE LOCK.
No. 437,591. Patented Sept. 30, 1890.
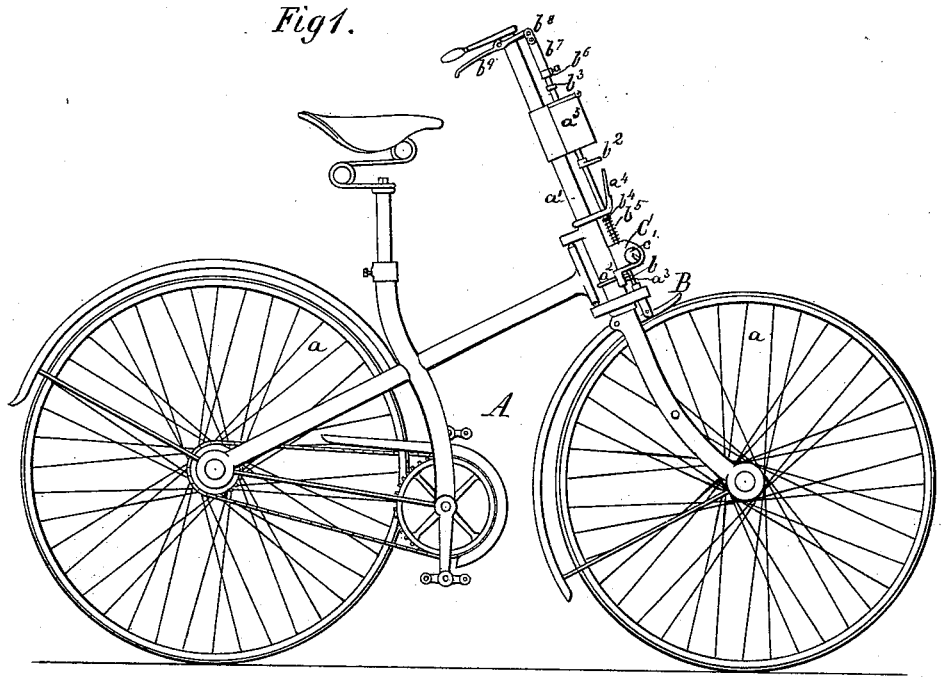
Fig 1.
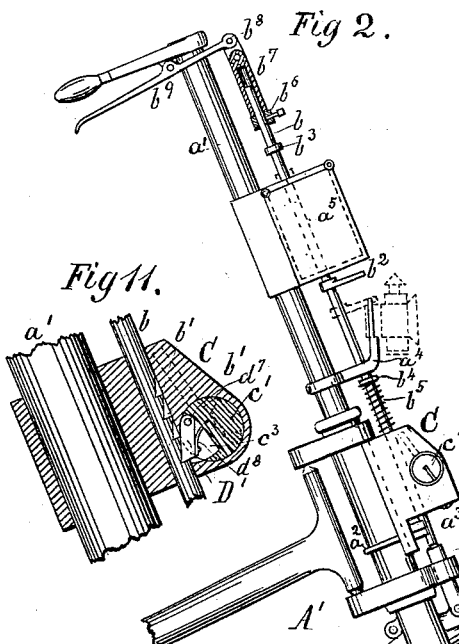
Fig 2. Fig 11.
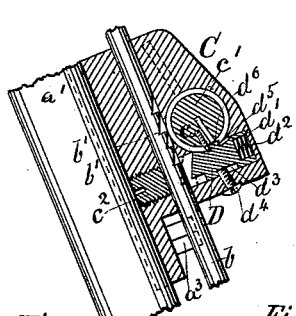
Fig 3.
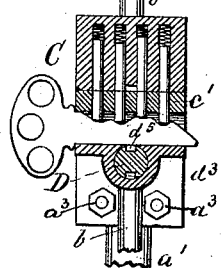
Fig 4.
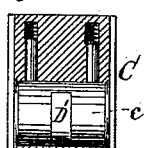
Fig 12.
Fig 5. Fig 6. Fig 7.
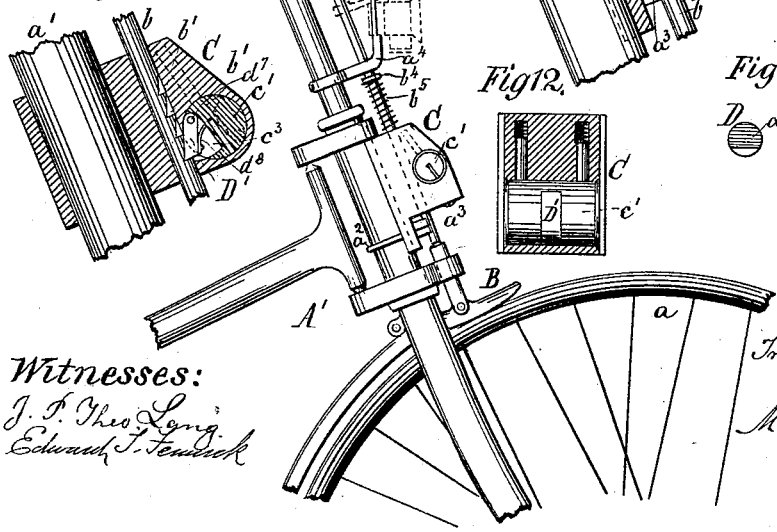
Witnesses:
J. T. Theo Long
Edward J. Fenwick
Inventor
Truman J. Glover
by his attorneys
Mason, Fenwick & Lawrence (No Model.) 2 Sheets—Sheet 2.
T. J. GLOVER.
BICYCLE BRAKE LOCK.
No. 437,591. Patented Sept. 30, 1890.
Fig 8. Fig 9.
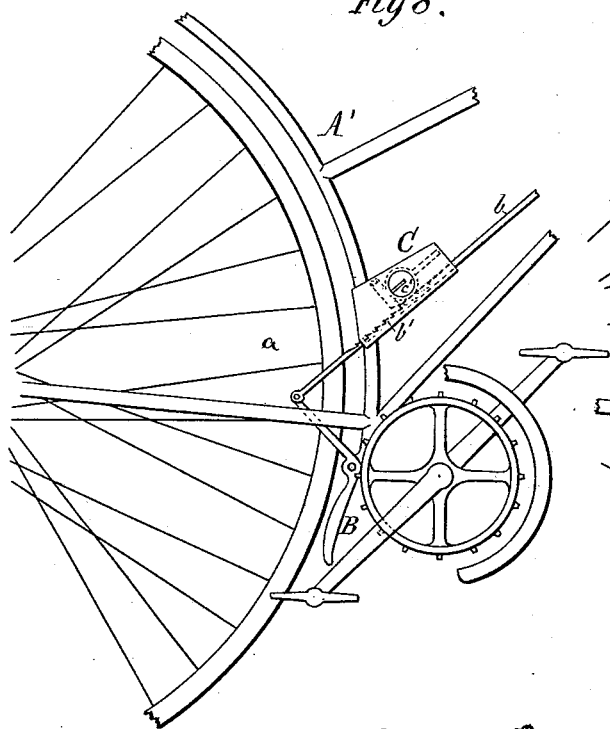
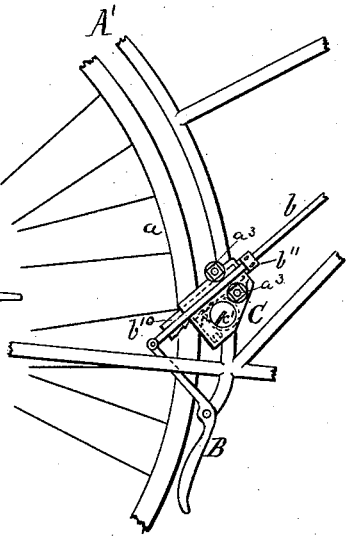
Fig 10.
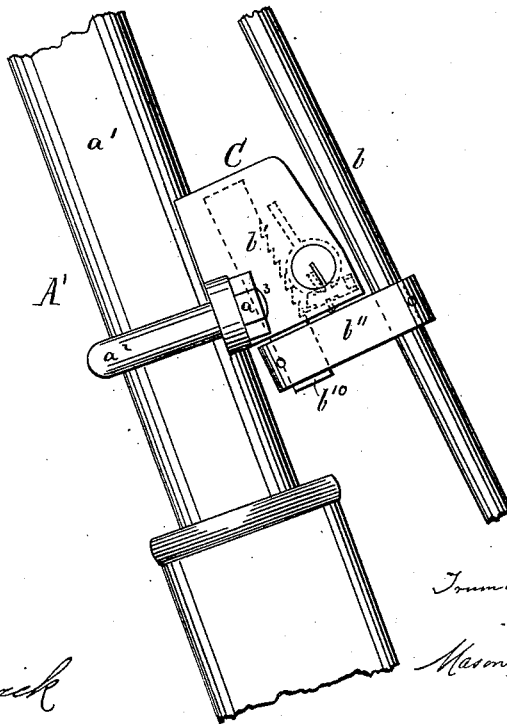
Witnesses:
J. P. Theo. Lang.
Edward J. Fenwick
Inventor
Truman J. Glover
by his attorneys
Mason, Fenwick and Lawrence

UNITED STATES PATENT OFFICE.

TRUMAN J. GLOVER, OF WASHINGTON, DISTRICT OF COLUMBIA.

BICYCLE-BRAKE LOCK.

SPECIFICATION forming part of Letters Patent No. 437,591, dated September 30, 1890.

Application filed July 21, 1890. Serial No. 359,425. (No model.)

*To all whom it may concern:*

Be it known that I, TRUMAN J. GLOVER, a citizen of the United States, residing at Washington city, in the District of Columbia, have invented certain new and useful Improvements in Bicycle Brakes and Locks; and I do hereby declare the following to be a full, clear, and exact description of the invention, such as will enable others skilled in the art to which it appertains to make and use the same.

My invention relates to brakes and locks for bicycles; and it consists in certain constructions, combinations, and arrangements of parts, whereby the brake, and also, if desirable, the lamp, tool-box, and other attachments of a bicycle can be safely secured, and at the same time the wheel or wheels of the bicycle held from turning when the bicycle is not in use, and thus the bicycle itself and anything attached thereto kept from being readily moved away by thieves.

In the accompanying drawings, Figure 1 represents a bicycle having the brake on its forward wheel, and illustrating one style of my improved locking device. Fig. 2 is an enlarged view of the locking device and contiguous portions of the bicycle frame, wheel, and brake. Fig. 3 is a vertical central section of the lock proper, and a view of portions of the steering-post and brake-rod. Fig. 4 is a central section through said lock, showing its tumblers and key in elevation. Fig. 5 is an end view of a sliding spring-pawl used in said lock. Fig. 6 is a top view of the same, and Fig. 7 is a view of the opposite end of the pawl. Fig. 8 is an illustration of my invention applied on the rear wheel of a bicycle, only a portion of the wheel, bicycle-frame, and brake-rod being shown. Figs. 9 and 10 are modified constructions of the lock proper, the same being adapted for a front or rear brake. Figs. 11 and 12 are also modified constructions of the lock.

The letter A in Fig. 1 of the drawings represents a bicycle having wheels $a$; B, the brake-shoe connected to brake-rod $b$; and C, the lock proper. The bicycle A has its brake-shoe B arranged above the front wheel $a$ and the brake-rod $b$ in front of the steering-post $a'$. The lock proper C is suitably fastened to the post $a'$, and is so arranged thereon that the brake-rod $b$ passes through it and can be easily moved therein. The portion of the brake-rod which passes through the lock is provided with ratchet-teeth $b'$, as shown in Figs. 3 and 11, and when the brake-rod is moved down these ratchet-teeth stand opposite to and engage with a sliding spring-pawl D in the lock, as in Fig. 3, or with a swinging spring-pawl D', as in Fig. 11. The spring-pawl in Fig. 3 is preferably of cylindrical form, having an inclined or ratchet-tooth matching face $d$, and a tubular rear end $d'$, in which is fitted a spring $d^2$. The bottom of said pawl is provided with a longitudinal groove $d^3$, into which enters a guiding set-screw $d^4$, which, while allowing the pawl to move back and forth, prevents it from turning and also from sliding too far out of its bearings. The top of the said pawl has two notches $d^5$, and an intermediate partition $d^6$, provided upon it, and by these means a pin or the head of a screw $c$ of the lock C is enabled to move the pawl and hold it in two positions, one of which positions is shown in full lines in Fig. 3, where it appears as withdrawn from the range of the ratchet-teeth $b'$, and the other position being shown in dotted lines, and representing the pawl engaged with one of the ratchet-teeth $b'$. The pin or screw $c$ is shown attached to the barrel $c'$ of a "Yale lock," and it will be readily seen that by a revolution of said barrel to one or the other side the two described movements will be produced in such a manner that the key of the lock can be withdrawn after each movement and the lock and pawl be left fixed or not capable of being moved except with the key.

In Fig. 2 the lock is shown fastened to the steering-post $a'$ by means of a U-bolt $a^2$, having nuts, only one of which $a^3$ being shown. These nuts are placed right and left of the brake-rod $b$, in close proximity thereto, so that they cannot be turned unless the brake-rod is removed.

In Fig. 3 the lock is shown provided with a screw-plug $c^2$ in line with and of the same diameter as the pawl D. This plug serves to close up a passage formed for the introduction and removal of the pawl from the lock. In order to prevent the brake-rod from accidentally changing its normal position, it is provided with a collar $d^4$ and a spring $d^5$, the latter placed, preferably, upon the top of the lock C, this spring by bearing upward against the collar $b^4$ serving for holding the brake-rod up in its proper position. The upper end portion of the brake-rod is provided with an adjustable collar $b^6$, which bears upwardly against a tubular brake-rod extension or connection $b^7$, said extension being pivoted at $b^8$ to the handle-lever $b^9$ of the bicycle. By this construction the brake-rod can only be moved down by the handle-lever $b^9$, and when the brake-rod is locked said lever cannot be operated to move the brake-rod, although it and the extension or connection $b^7$ can be vibrated.

The post $a'$ is provided with an ordinary lamp-holder $a^4$ and an ordinary tool-box $a^5$, and the brake-rod $b$ is provided with an arm $b^2$, which descends with the brake-rod upon the lamp-holder $a^4$ and locks the lamp thereto, and also with a collar $b^3$, which descends with the brake-rod upon the lid $a^6$ of the tool-box $a^5$, thereby holding it closed as long as the brake-shoe B is locked on the wheel.

In Fig. 8 the lock is shown adapted to be attached to the rear portion of the frame A' of a bicycle, to which frame the brake B is also attached, the brake-rod passing through the lock and being locked in the same manner as hereinbefore described.

In Figs. 9 and 10 a ratchet rod or bar $d^{10}$ is shown attached to the brake-rod $b$ by means of a bracket $b^{11}$ and as passing through the lock C, while the brake-rod passes outside the lock.

In Fig. 11 the barrel $c'$ of the lock is provided with a swinging pawl D', pivoted at $d^7$ to the barrel and having a spring $d^8$ attached to it, by which it is pushed out of the barrel into one of the ratchet-teeth $b'$ of the brake-rod $b$. A chamber $c^8$ is provided in the barrel $c'$, into which the pawl D' is backed when the ratchet-teeth $b'$ are not within its range or when the barrel is turned by the key of the lock. The lock C, Fig. 11, is to have a key which will on withdrawal either leave the pawl positively held in or out of the ratchet-teeth. With this modified construction of lock the adjuncts hereinbefore described for holding the tool-bag and lamp may be employed.

What I claim as my invention is—

1. In a bicycle brake and lock, in combination, a locking mechanism and a bicycle brake rod and shoe adapted to be adjusted downwardly and locked by said mechanism in such a position that the bicycle-wheel is caused to become fixed by the brake-shoe and prevented from turning, substantially as described.

2. In a bicycle brake and lock, in combination, a bicycle brake-rod having ratchet-teeth, and the wheel-post or frame having a key-lock and pawl, substantially as described.

3. In a bicycle, a brake-rod adapted to be locked in a position to force the brake-shoe upon the wheel and provided with a lamp-locking arm, substantially as described.

4. In a bicycle, the handle-lever connected by means of links to an extensible brake-rod connection, substantially as described.

5. In a bicycle, the brake-rod having an adjustable collar bearing against a tubular connection in which the upper portion of the brake-rod is sheathed, and a spring holding the brake-rod up and the brake-shoe away from the wheel, substantially as described.

6. In a bicycle, the combination of the locking mechanism, a brake-shoe, brake-rod, and a handle-lever, the said handle-lever and the upper portion or connection of the brake-rod being movable independently of the lower portion of the brake-rod when the brake is applied in a locked position upon the wheel and said upper portion of the brake-rod movable with the lower portion during the act of applying the brake-shoe to its locking position upon the wheel, substantially as described.

7. In a bicycle, the brake-rod adapted to be locked with the brake-shoe upon the wheel and provided with a collar for holding down the lid of a tool-box, substantially as described.

8. In a bicycle, the combination, with a brake-rod, of the lock C, provided with a rotary barrel $c'$, having a pivoted pawl D' swinging out of it and into a recess into its periphery, substantially as described.

In testimony whereof I hereunto affix my signature in presence of two witnesses.

TRUMAN J. GLOVER.

Witnesses:
EDWARD T. FENWICK,
J. P. THEODORE LANG.